United States Patent
Kadowaki (10) Patent No.: US 7,366,815 B2
(45) Date of Patent: Apr. 29, 2008

(54) METHOD AND APPARATUS FOR SERIAL COMMUNICATION SYSTEM CAPABLE OF IDENTIFYING SLAVE APPARATUS USING HALF-DUPLEX CHANNEL COMMUNICATION METHOD

(75) Inventor: Yukio Kadowaki, Nara (JP)

(73) Assignee: Ricoh Company, Ltd., Tokyo (JP)

( * ) Notice: Subject to any disclaimer, the term of this patent is extended or adjusted under 35 U.S.C. 154(b) by 135 days.

(21) Appl. No.: 11/206,550

(22) Filed: Aug. 18, 2005

(65) Prior Publication Data

US 2006/0041631 A1 Feb. 23, 2006

(30) Foreign Application Priority Data

Aug. 19, 2004 (JP) .............................. 2004-239706

(51) Int. Cl.
G06F 13/14 (2006.01)
G06F 13/00 (2006.01)
G06F 13/42 (2006.01)
G06F 13/36 (2006.01)

(52) U.S. Cl. ....................................... 710/305; 710/110
(58) Field of Classification Search ...................... None
See application file for complete search history.

(56) References Cited

U.S. PATENT DOCUMENTS

| | | | |
|---|---|---|---|
| 3,993,981 A * | 11/1976 | Cassarino et al. ........... 710/114 |
| 5,862,354 A | 1/1999 | Curiger et al. | |
| 5,864,872 A * | 1/1999 | Lee et al. .................... 711/115 |
| 5,978,927 A | 11/1999 | Curry et al. | |
| 6,108,751 A | 8/2000 | Lee et al. | |
| 6,239,732 B1 | 5/2001 | Cusey | |
| 6,412,072 B2 | 6/2002 | Little et al. | |
| 6,532,506 B1 * | 3/2003 | Dunstan et al. ............. 710/100 |
| 7,143,215 B2 * | 11/2006 | Dunstan et al. ............. 710/104 |
| 2002/0101884 A1 * | 8/2002 | Pohlmeyer et al. ......... 370/509 |
| 2004/0049616 A1 * | 3/2004 | Dunstan et al. ............. 710/100 |

* cited by examiner

Primary Examiner—Paul R. Myers
Assistant Examiner—Ryan M Stiglic
(74) Attorney, Agent, or Firm—Cooper & Dunham, LLP (57) ABSTRACT

A serial communication system is provided which performs serial communication between host and slave apparatus using half-duplex channel communication with a serial data signal generated by superimposing a data signal on a clock signal. The host apparatus transmits through a transmission path an identification signal generated by superimposing on the clock signal identification data for specifying a slave apparatus to be requested, after transmitting through the transmission path a preamble signal generated by superimposing successively repeated data on the clock signal.

15 Claims, 6 Drawing Sheets

METHOD AND APPARATUS FOR SERIAL COMMUNICATION SYSTEM CAPABLE OF IDENTIFYING SLAVE APPARATUS USING HALF-DUPLEX CHANNEL COMMUNICATION METHOD

This patent specification is based on Japanese patent application, No. 2004-239706 filed on Aug. 19, 2004 in the Japan Patent Office, the entire contents of which are incorporated by reference herein.

FIELD

The present invention relates to a method and system for performing serial communication, and more particularly to a method and system for performing serial communications between host and slave apparatuses using half-duplex channel communication with a serial data signal superimposing a data signal on a clock signal.

DISCUSSION OF THE BACKGROUND

Personal computers handle mostly parallel data with byte length and word length. To transmit parallel data through a cable, the cable is needed to be a multiple wire cable including eight wires for byte length data or sixteen wires for word length data. However, it is not cost effective to use the multiple wire cable especially when a transmission length becomes relatively long. Since a serial data communication method contributes reduction of the number of wires, variety of serial communication methods have been proposed. When byte data is transmitted, the byte data is broken down to bit data and the bit data is then transmitted.

Figure 1:
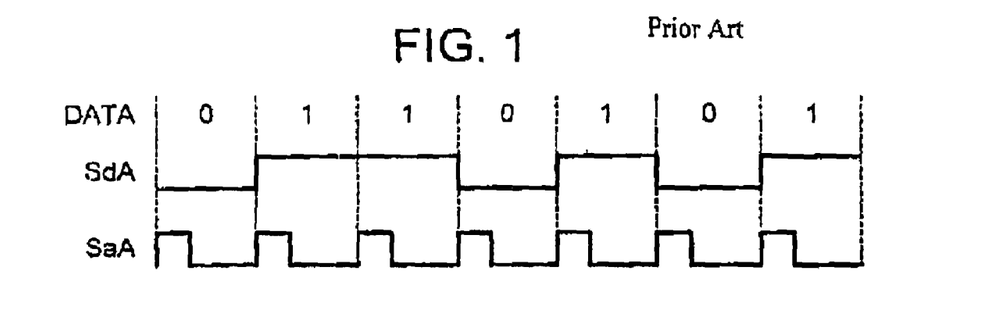
FIGS. 1 to 4 show examples of wave forms used in conventional serial communication systems.

FIGS. 1 to 4 show general methods of serial data communications. FIG. 1 illustrates one example method in which two signals are used. One of the two signals is a data signal SdA to represent data simply as levels of the signal. The other signal is a synchronizing signal SaA which represents boundaries of the data and extracts the data from the data signal SdA by a rising edge of the synchronizing signal SaA. In this method, at least two signal wires are needed.

Figure 2:
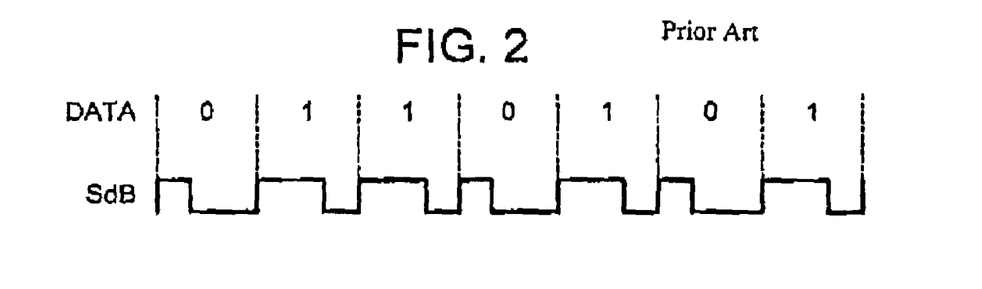

FIG. 2 illustrates another method which is called a pulse width modulation method. Signal SdB is modulated with regard to a pulse width and changes a time period of high level. A pulse width for data "1" differs from a pulse width for data "0". However, a relatively large circuit is necessary to perform a complicated procedure of the pulse width modulation.

Figure 3:
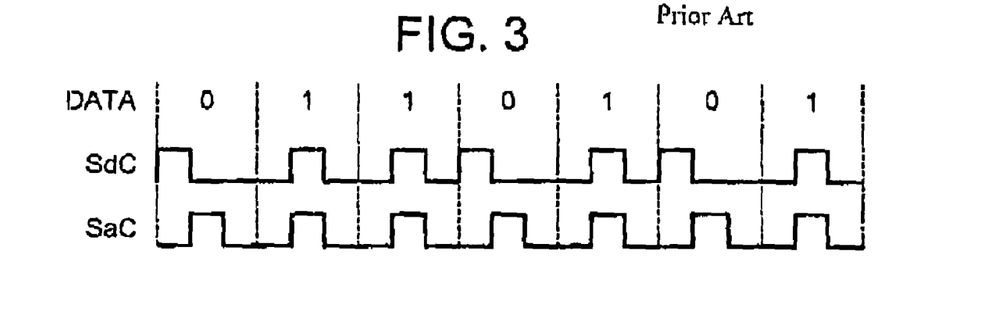

FIG. 3 illustrates another method which is called a pulse position modulation method. In this method, each pulse has the same width as others but positions of pulses of a data signal SdC are changed depending on the data. Sampling of the data signal SdC is performed using a synchronization signal SaC which represents a base time. Also, a relatively large circuit is necessary to perform a complicated procedure of the pulse position modulation.

Figure 4:
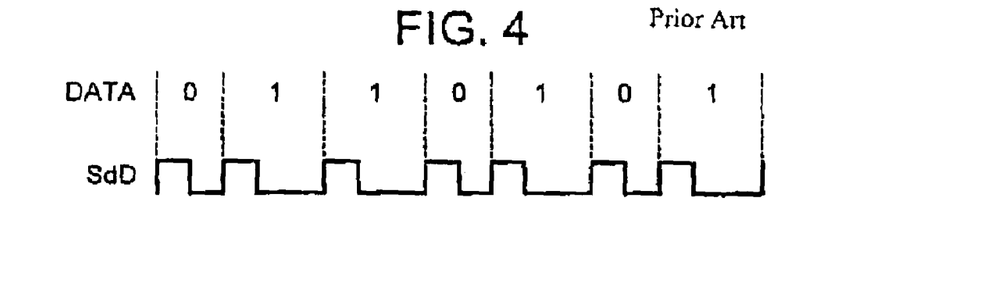

FIG. 4 illustrates another method which is commonly used in infrared remote-control systems. This method is a combination of the width modulation method and the pulse position modulation method. Time intervals from data to next data in a data signal SdD are not constant. Thus, the data signal SdD is a kind of an asynchronous signal which requires no clock signal. However, this method requires a relatively large circuit to perform the complicated function.

Figure 5:
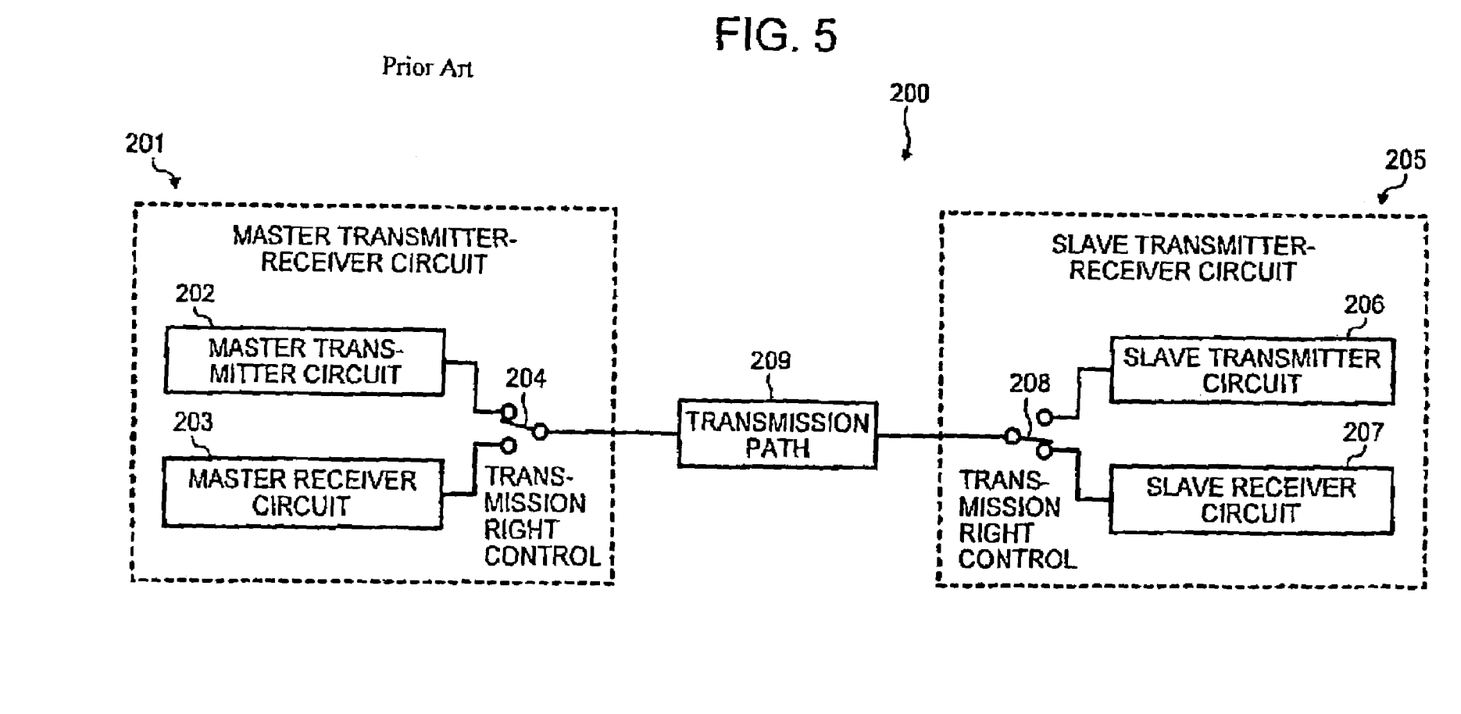
FIG. 5 illustrates a block diagram of a conventional serial communication apparatus using half-duplex channel communication.

Among the serial communication methods, a half-duplex channel communication method is frequently used because of its simplicity. FIG. 5 illustrates a block diagram of a conventional serial communication apparatus 200 using the half-duplex channel communication. The serial communication apparatus 200 includes a master transmitter-receiver circuit 201, a slave transmitter-receiver circuit 205 and a transmission path 209. The master transmitter-receiver circuit 201 includes a master transmitter circuit 202, a master receiver circuit 203 and a master control switch 204. The slave transmitter-receiver circuit 205 includes a slave transmitter circuit 206, a slave receiver circuit 207 and a slave control switch 208.

The slave transmitter circuit 206 is similarly configured to the master transmitter circuit 202. The slave receiver circuit 207 is also similarly configured to the master receiver circuit 203. Each of the master and slave control switches, 204 and 208, controls possession of transmission right which determines a transmission direction through the transmission path 209 between the master transmitter-receiver circuit 201 and the slave transmitter-receiver circuit 205.

When the master transmitter-receiver circuit 201 holds the transmission right, data is transmitted from the master transmitter circuit 202 to the slave receiver circuit 207. On the other hand, when the transmission right is held by the slave transmitter-receiver circuit 205, data is transmitted from the slave transmitter circuit 206 to the master receiver circuit 203.

In such conventional serial communication apparatus, relatively large slave circuits are required to be able to operate the same functionality as a circuit in the master side. Moreover, complicated switching circuits are needed to switch the direction of the transmission. Thus, there are increasing demands for an improved technique for transmitting serial data with a smaller circuit and less wires.

SUMMARY

This patent specification describes a novel serial communication system between host and slave apparatuses using half-duplex channel communication.

According to one exemplary embodiment, a serial communications system comprises a host apparatus, a plurality of slave apparatuses, a master circuit, a plurality of slave circuits, and a transmission path. The host apparatus is configured to send first data. Each of the slave apparatuses is configured to return second data in response to the first data sent from the host apparatus. The master circuit is connected to the host apparatus, and performs (a) a first master operation using the first data from the host apparatus and (b) a second master operation to transmit to the host apparatus the second data sent from an arbitrary one of the slave apparatuses. The slave circuits are connected to the slave apparatuses on a one-to-one basis, and each of the slave circuits performs (i) a first slave operation to send the first data to the plurality of slave apparatuses including a designated slave apparatus in response to the first master operation and (ii) a second slave operation to cause the master circuit to perform the second master operation. The transmission path connects the master circuit to the slave circuit.

According to another exemplary embodiment, the host apparatus transmits through the transmission path an identification signal generated by superimposing on a clock signal identification data for specifying a slave apparatus to be requested, after transmitting a preamble signal generated by superimposing successively repeated data pulse on the clock signal to the transmission path.

This patent specification further describes, according to another example, a novel feature of a serial communication system in which a designated slave apparatus matching with the identification signal transmits acknowledgement data, and an acknowledge signal generated by superimposing the acknowledgement data on the identification signal is returned.

This patent specification also describes a novel method for performing serial communication using half-duplex channel communication which includes the steps of transmitting through a transmission path a preamble signal generated by superimposing successively repeated data on a clock signal, transmitting a serial identification signal generated by superimposing on the clock signal identification data sent from a host apparatus after transmitting the preamble signal, extracting the identification data from the serial identification signal received through the transmission path, outputting the extracted identification data to a slave apparatus, transmitting through the transmission path a second serial data signal generated by superimposing on the serial identification signal second data sent from a designated slave apparatus, extracting the second data from the second serial data signal received through the transmission path and outputting the extracted second data to the host apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 6, a serial communication system 100 according to a preferred embodiment is explained.

Figure 6:
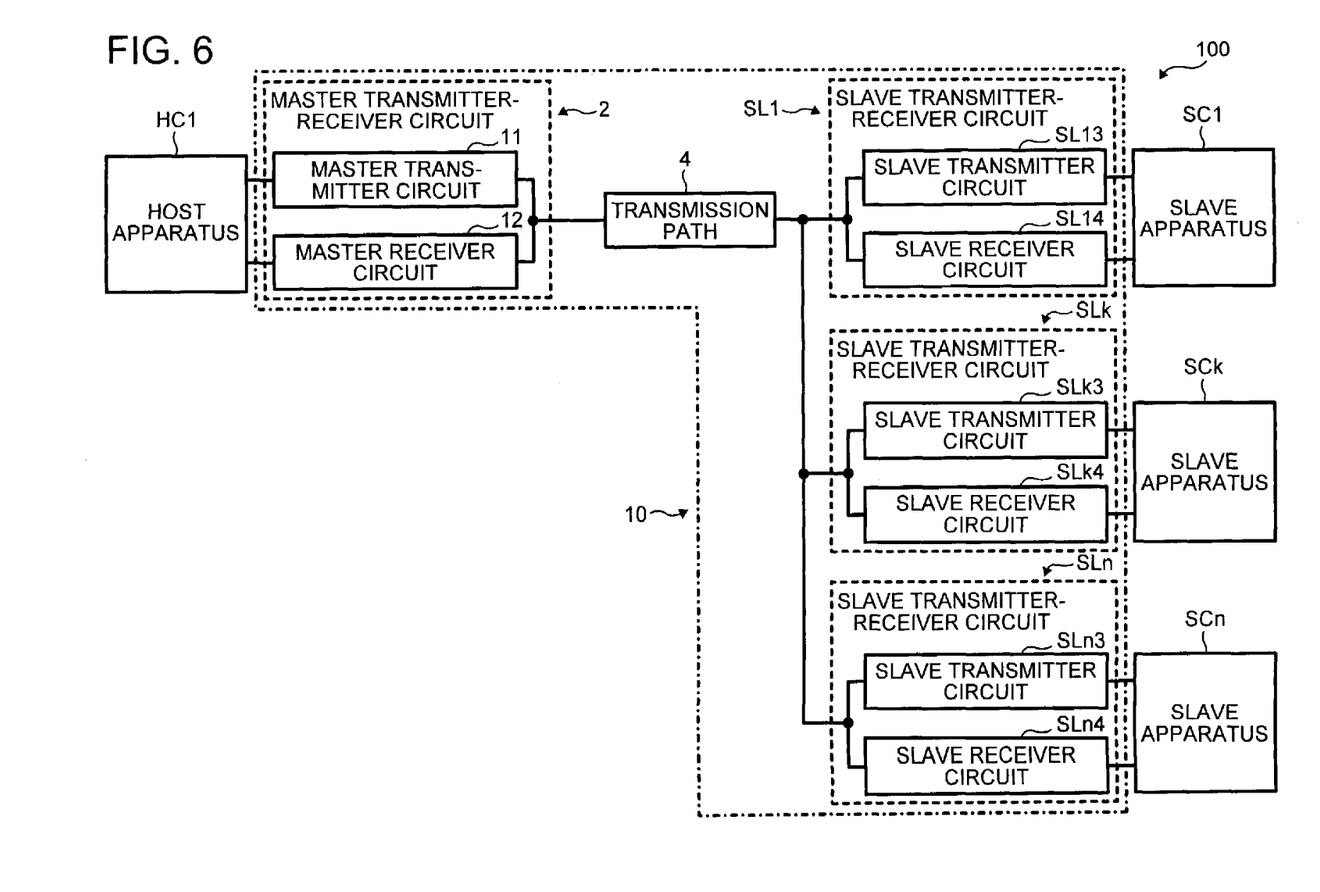
FIG. 6 illustrates a block diagram of a serial communication system according to a preferred embodiment.

The serial communication system 100 of FIG. 6 includes a serial communication apparatus 10, a host apparatus HC1 and a plurality of slave apparatuses SC1 to SCn (n is a positive integer greater than 0). The serial communication apparatus 10 includes a master transmitter-receiver circuit 2, a transmission path 4 and a plurality of slave transmitter-receiver circuits SL1 to SLn(n is a positive integer greater than 0).

The master transmitter-receiver circuit 2 is connected to the host apparatus HC1, and the slave transmitter-receiver circuits SL1 to SLn are connected to the slave apparatuses SC1 to SCn, respectively. The transmission path 4 connects the master transmitter-receiver circuit 2 to the plurality of slave transmitter-receiver circuits SL1 to SLn. The transmission path 4 is configured to transmit a serial signal and may be formed by an electrically conductive wire. Moreover, the transmission path 4 may be a light path, or a radio wave path.

The master transmitter-receiver circuit 2 includes a master transmitter circuit 11 and a master receiver circuit 12. The slave transmitter-receiver circuit SL1, for example, includes a slave transmitter circuit SL13 and a slave receiver circuit SL14. The slave transmitter-receiver circuits SL2 to SLn use a similar circuit configuration to the slave transmitter-receiver circuit SL1. Similarly, one of the slave transmitter-receiver circuits SLk (k=1 to n) includes a slave transmitter circuit SLk3 (k=1 to n) and a slave receiver circuit SLk4 (k=1 to n). The master transmitter circuit 11 and the master receiver circuit 12 are connected to the slave transmitter circuits SLk3 and the slave receiver circuits SLk4 through the transmission path 4.

When the data is transmitted from the master transmitter-receiver circuit 2 to the slave transmitter-receiver circuit SLk, the master transmitter circuit 11 generates a serial data signal DATA1 by superimposing master data on a clock signal TCLK input from the host apparatus HC1 during a high level of the clock signal TCLK. The serial data signal DATA1 is then transmitted to the slave transmitter-receiver circuit SLk through the transmission path 4. The slave receiver circuit SLk4 extracts the master data from the serial data signal DATA1.

Further, when the slave transmitter-receiver circuit SLk transmits data to the master transmitter-receiver circuit 2, the slave transmitter-receiver circuit SLk writes slave data on the serial data signal DATA1 which was transmitted from the master transmitter-receiver circuit 2 through the transmission path 4. The slave transmitter circuit SLk3 is connected to the slave receiver circuit SLk4 and generates a serial data signal DATA2 by superimposing a slave data on the serial data signal DATA1 input through the transmission path 4 during a low level of the master clock signal TCLK and transmits the serial data signal DATA2 to the master transmitter-receiver circuit 2 through the transmission path 4. The master receiver circuit 12 then extracts the slave data from the serial data signal DATA2.

If this system is used in, for example, a mobile telephone, each slave apparatus can correspond to, for example, a temperature detection apparatus, a detection apparatus to detect remaining amount of battery, an identifying apparatus to identify battery type, etc. The slave apparatuses, the temperature detection apparatus and the detection apparatus can be connected to a battery embedded in a battery pack.

Figure 7:
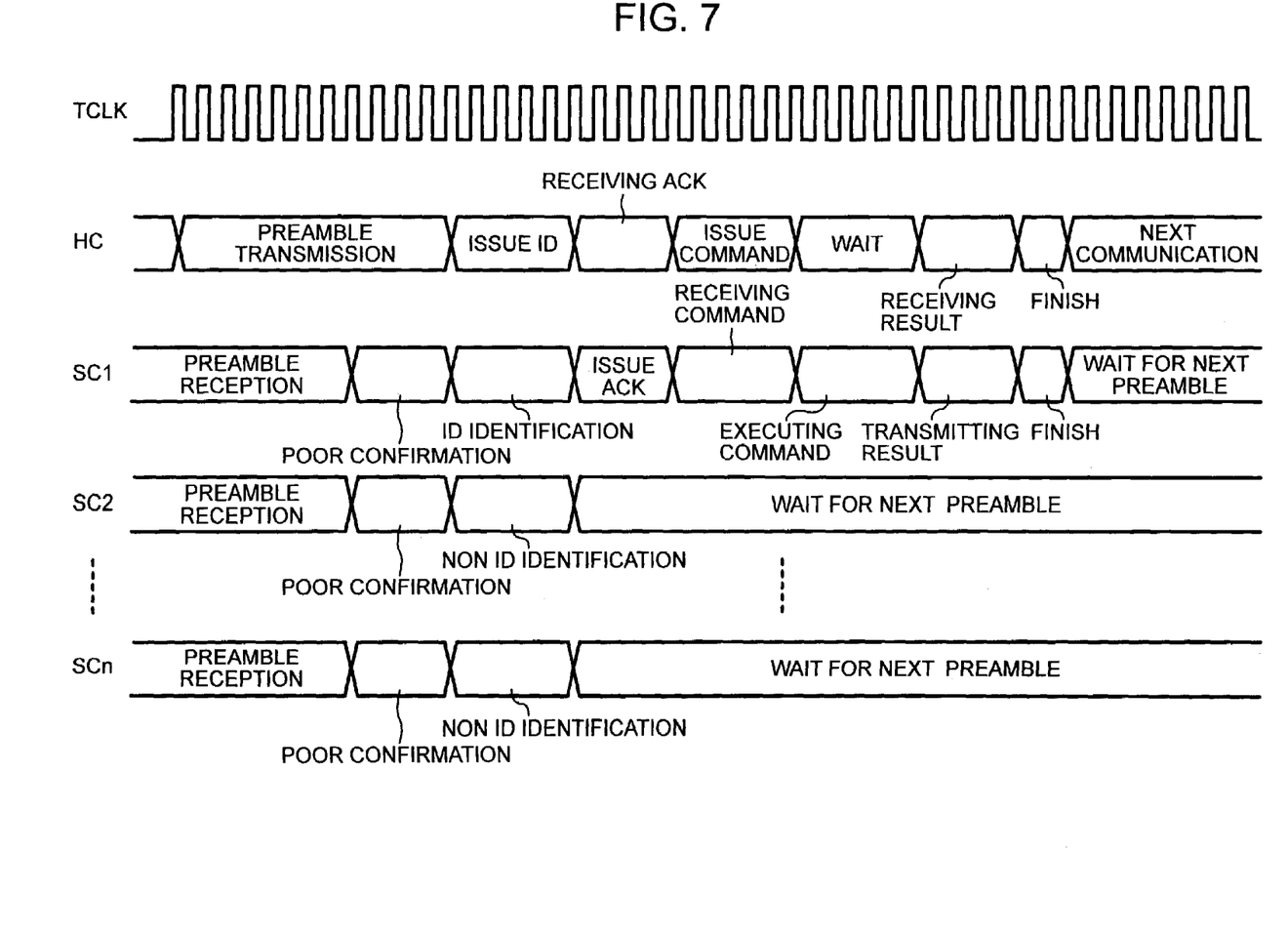
FIG. 7 illustrates wave forms of a protocol used in the serial communication system of FIG. 6.

FIG. 7 illustrates a protocol for the serial communication system 100 shown in FIG. 6. Using the serial communication apparatus 10, the host apparatus HC1 performs preamble transmission in which successively repeated pulses having a high level are transmitted to the slave apparatuses SC1 to SCn at the beginning of the communication. When each slave apparatus receives the successively repeated pulses having the high level, the slave apparatus recognizes that it is in a period of the preamble transmission and sets its state to a preparation state. In order to specify the slave apparatus SC1, for example, the host apparatus HC1 transmits an ID (identification) which is a specific code, to the slave apparatus SC1 after the host apparatus HC1 transmits a clock pulse of a low level at the preparation state.

The slave apparatus SC1 to SCn receives the ID after the slave apparatus SC1 to SCn receives the clock pulse of the low level following the preamble transmission. Each of the slave apparatuses SC1 to SCn then judges whether the ID identifies its own ID. In this case, only the slave apparatus SC1 recognizes that the received ID matches its own specific ID, and in contrast the other slave apparatuses recognize that the ID is different from their own ID.

When the slave apparatus SC1 recognizes that the ID sent from the host apparatus is identical with its own ID, the slave apparatus SC1 returns an acknowledge signal ACK which is a recognition signal to the host apparatus HC1. When the host apparatus HC1 confirms that the acknowledge signal ACK is delivered on the transmission path 4 which is a wire line, the host apparatus HC1 now recognizes that the slave apparatus SC1 is connected to the wire line and is able to properly communicate with.

After this recognition, the host apparatus HC1 issues a command to the slave apparatus SC1. When the slave apparatus SC1 receives the command sent from the host apparatus HC1, the slave apparatus SC1 executes the command.

If the command includes a request to return a result of the execution, the slave apparatus SC1 executes in accordance with the command and returns the result of the execution. If the command requests to read data stored in a register at a specific address, the slave apparatus SC1 reads the data from the register and returns the data as a result of an execution of the command to the host apparatus HC1. When the host apparatus HC1 confirms reception of the data, one execution job has been completed. If the host apparatus HC1 keeps on executing a next job for the slave apparatus SC1 or other slave apparatus, the host apparatus HC1 starts to transmit a preamble signal again for the next job.

As described above, the wire bus communication method is a useful method for achieving cost reduction and is frequently used because devices used in a system are requested to be with small number of terminals. Circuitry used in the slave apparatus is desired not to be specific and is applicable for general purpose in order to achieve cost reduction. This is because cost reduction can be generally achieved by volume production.

In order to make the circuitry of the slave apparatus more general, however, various situations can be taken into consideration. If a slave apparatus is used for a different system, a different time period to the preamble signal may be requested from a time period requested for other slave apparatus. Therefore, the circuitry is preferably not configured to have a fixed time period of preamble signal but rather to be configured with a flexible time period during a preamble state.

For example, if the slave apparatuses SC1, SC2 and other slave apparatuses need a time more than 32, 20 and 16 clock pulses for setting the preamble state, respectively, 36 clock pulses for setting the preamble state may be used in consideration of taking noise margin. In this example, because each slave apparatus can enter the preamble state after receiving 36 clock pulses, the slave apparatus can be set into a ID detection state at the same time by sending a low level pulse following the preamble state.

If it is known that a slave apparatus to be selected is already connected to the one wire bus before starting a communication, the host apparatus HC1 can transmit a command to the slave apparatus after selecting the slave apparatus by issuing a specific ID for the slave apparatus. This procedure provides an advantage of a shorter communication time. However, it may not be applicable when the wire bus is open to outside of the system and a slave apparatus to be selected is connected to the wire bus from outside of the system. Accordingly, the host apparatus HC1 is requested to confirm whether a slave apparatus to be selected is connected to the wire bus at a starting point of the communication.

The host apparatus HC1 issues an ID following a preamble transmission and recognizes that a slave apparatus to be selected is connected to the wire bus by receiving a return signal from the slave apparatus. The return signal is an acknowledge signal ACK issued by the slave apparatus as a result of issuance by the host apparatus HC1 of the slave apparatus's identification. When the slave apparatus is connected properly, the slave apparatus works as a part of the system. If the host apparatus receives no return of an acknowledge signal ACK, the host apparatus recognizes that the slave apparatus is not connected and may manage the system to work without the slave apparatus. This procedure is useful especially in a case where a slave apparatus may be an optional apparatus.

When an error function takes place at the slave apparatus, it is requested to reset a system because both clock signal and data signal are transmitted through the one wire bus. In this case, however, the data communication itself may not be possible.

In order to solve the problem, the slave apparatus is configured to place itself in an initial state when successively repeated data of a level pulse is input for a period of time. In other word, it is possible to make the slave apparatus reset through this configuration. The host apparatus can initialize each slave apparatus connected to the wire bus to a preparation state for a preamble state, for example, by sending 128 successive pulses of high level. Also, the host apparatus can initialize by applying this procedure even when a slave apparatus is recognized by the host apparatus at the beginning of a system operation but suddenly stops returning an acknowledge signal ACK due to the error function after some interval.

Figure 8:
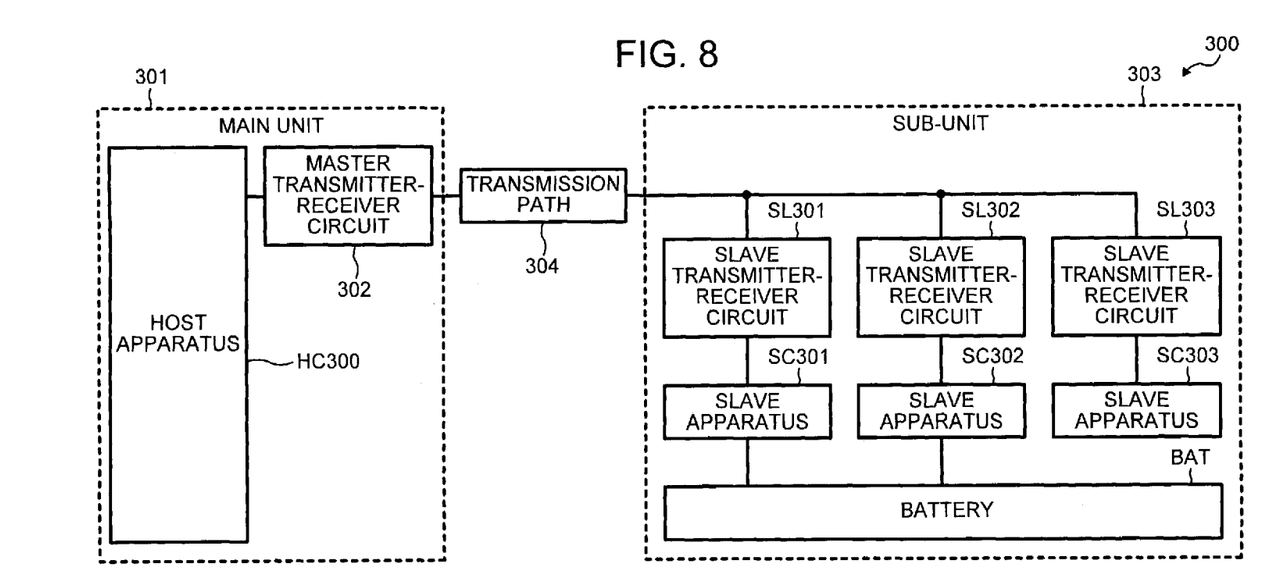
FIG. 8 illustrates a block diagram of a serial communication system, for an example of a battery pack, according to another preferred embodiment.

FIG. 8 illustrates a block diagram of an exemplary embodiment of a serial communication system 300. The serial communication system 300 includes a main unit 301, a sub unit 303 and a transmission path 304. The main unit 301 includes host apparatus HC300 and the master transmitter-receiver circuit 302. The sub unit 303 is a battery pack in this exemplary embodiment and includes three pairs of slave transmitter-receiver circuits and corresponding slave apparatuses, SL301 and SC301, SL302 and SC302, SL303 and SC303, and a battery BAT. (n=3 in this embodiment)

In FIG. 8, for example, the slave apparatus SC301 is a battery indicator and the slave apparatus SC302 is a temperature sensor for the battery BAT. An authentication procedure for the slave apparatus SC303 is discussed below. When the host apparatus HC300 communicates with the slave apparatus SC303, the host apparatus HC300 inputs a number "3" as an ID for the slave apparatus SC303 after a preamble transmission.

The slave apparatus SC303 recognizes that the ID is its own ID, and then returns an acknowledge signal ACK to the transmission path 304. The other slave apparatuses, SC301 and SC302, do not return an acknowledge signal ACK because the ID does not match their own ID. When the host apparatus HC300 confirms reception of the acknowledge signal ACK from the slave apparatus SC303, the host apparatus HC300 starts to communicate with the slave apparatus SC303 because the slave apparatus SC303 is recognized as a device which holds the authentication ID.

The host apparatus HC300 starts to transmit a specific code to the slave apparatus SC303 which is the device holding authentication ID through the master transmitter-receiver circuit 302 and the transmission path 304. When the device which holds the authentication ID of the slave apparatus SC303 receives the specific code sent from the host apparatus HC300, the device encrypts the specific code and returns it to the host apparatus HC300.

The master transmitter-receiver circuit 302 receives the encrypted code from the slave apparatus SC303 and sends the encrypted code to the host apparatus HC300. The host apparatus, HC300 decrypts the encrypted code and recognizes that the device holding the authentication ID in the battery pack is the requested device. A similar protocol can be applied to identify the battery indicator which is the slave apparatus SC301 and to identify the temperature sensor which is the slave apparatus SC302.

Furthermore, it is implemented generally in a similar way to identify an arbitrary slave apparatus SCk (k=1 to n) through the wire bus and the transmission path 4 (FIG. 6). When the host apparatus HC1 transmits a specific code to a slave apparatus SCk, the slave apparatus SCk generates an encrypted code based on the specific code and returns it to the host apparatus HC1.

Figure 9:
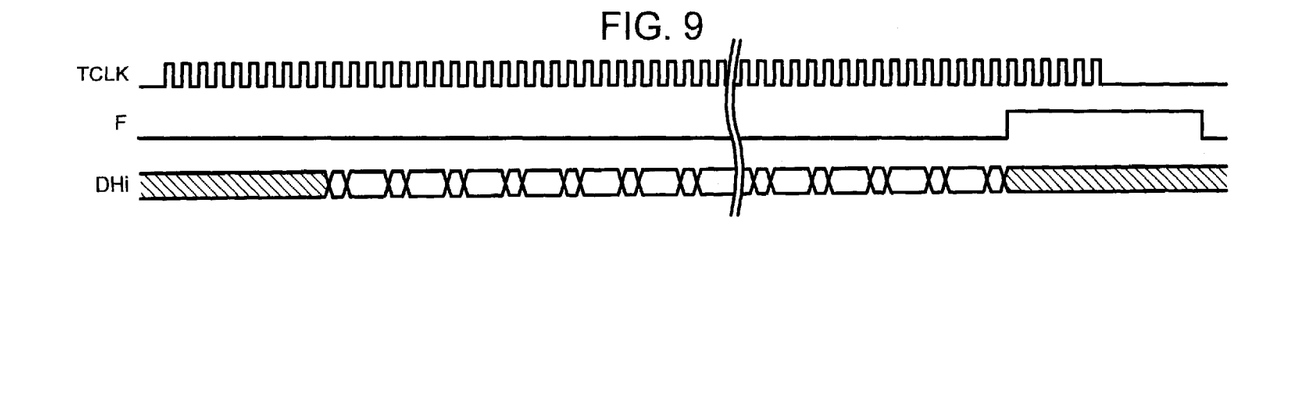
FIG. 9 illustrates wave forms of another protocol used in the serial communication system of FIG. 6.

FIG. 9 illustrates examples of wave forms which can be used in the protocol used in the serial communication system 100 shown in FIG. 6. The host apparatus HC1 decrypts data DH1 sent from the slave apparatus SCk (k=1 to n). If the result of the decryption is identical to the requested code, the host apparatus HC1 sets an internal flag F to a high level. Then, the host apparatus HC1 finalizes an identification sequence by stopping supply of the clock signal TCLK and resets the master transmitter-receiver circuit 2. In order to start a next identification sequence again, the host apparatus HC1 is requested to supply a clock signal TCLK. When the clock signal TCLK is supplied, the next identification sequence starts automatically.

On the other hand, if a decryption result is not identical to the requested code, the host apparatus HC1 does not set an internal flag F to a high level. The host apparatus HC1 stops supplying a clock signal TCLK after a time period as a result of failure in an identifying process. In this case, the host apparatus HC1 also resets the master transmitter-receiver circuit 2. The host apparatus HC1 implements a next identification process when the host apparatus HC1 recognizes a necessity of a start for the next identification process.

According to the embodiment, using serial communication apparatus 10, the host apparatus HC1 transmits a serial data signal DATA generated by superimposing a master data on a clock signal TCLK to each slave apparatus SC1 to SCn after confirming an ID to specify a designated slave apparatus following a preamble transmission including a plurality of successively repeated data. Thus the host apparatus HC1 of the serial communication system 100 can communicate with the designated slave apparatus out of a plurality of slave apparatuses without using switching mechanism, and a compact and inexpensive system can be achieved.

Figure 10:
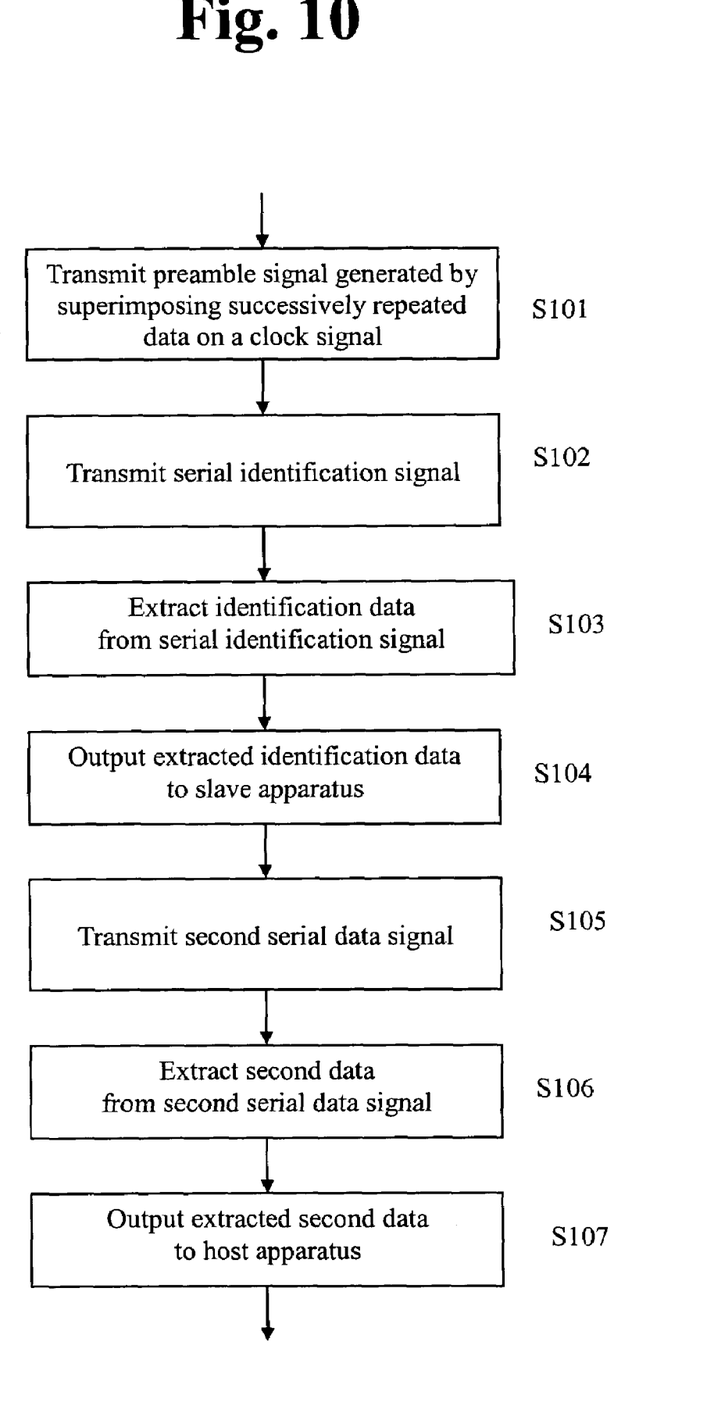
FIG. 10 illustrates a flow chart for a method for performing serial communication using half-duplex channel communication, according to an exemplary embodiment.

FIG. 10 illustrates a flow chart for a method for performing serial communication using half-duplex channel communication, according to an exemplary embodiment. A preamble signal generated by superimposing successively repeated data on a clock signal is transmitted through a transmission path (step S101). After the preamble signal is transmitted (step S101), a serial identification signal generated by superimposing on the clock signal identification data sent from a host apparatus is transmitted (step S102). The identification data is extracted from the serial identification signal received through the transmission path (step S103). The extracted identification data is output to a slave apparatus (step S104). A second serial data signal generated by superimposing on the serial identification signal the second data sent from a designated slave apparatus is transmitted to the transmission path (step S105). The second data is extracted from the second serial data signal received through the transmission path (step S106). The extracted second data is output to the host apparatus (step S107).

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

What is claimed is:

1. A serial communications system which performs half-duplex channel serial communications, the serial communications system comprising:

a host apparatus configured to send first data;

a plurality of slave apparatuses each configured to return second data in response to the first data sent from the host apparatus;

a master circuit connected to the host apparatus and configured to perform a first master operation using the first data from the host apparatus and a second master operation to transmit to the host apparatus the second data sent from an arbitrary one of the plurality of slave apparatuses;

a plurality of slave circuits connected to the plurality of slave apparatuses on a one-to-one basis and each slave circuit being configured to perform a first slave operation to send the first data to a plurality of the slave apparatuses including a designated slave apparatus in response to the first master transmission operation and a second slave operation to cause the master circuit to perform the second master operation; and a transmission path configured to connect the master circuit to the slave circuit, wherein in the first master operation, the master circuit receives the first data from the host apparatus, superimposes the first data on a clock signal to generate a first serial data signal, and transmits the first serial data signal to the plurality of slave circuits via the transmission path, and wherein the slave circuit is configured to superimpose the second data on the first serial data signal during a low level of the clock signal, to generate a second serial data signal, and transmit the second serial data signal to the master circuit via the transmission path.

2. The system serial communications according to claim 1, wherein in the first slave operation upon receiving the first serial data signal each one of the plurality of slave circuits is configured to:

extract the first data from the first serial data signal; and transmit the first data to the designated slave apparatus, wherein in the second slave operation each one of the plurality of slave circuits is configured to:
receive the second data from the arbitrary one of the plurality of slave apparatuses;
superimpose the second data on the first serial data signal to generate a second serial data signal; and
transmit the second serial data signal to the master circuit via the transmission path, and
wherein the second master operation upon receiving the second serial data signal, the master circuit is configured to:
extract the second data from the second serial data signal; and
output the second data to the host apparatus.

3. The serial communications system according to claim 2, wherein the first data sent from the host apparatus includes a preamble signal including a plurality of successively repeated data and an identification signal following the preamble signal for specifying the designated one of the plurality of slave apparatuses.

4. The serial communications system according to claim 3, wherein the plurality of successively repeated data included in the preamble signal lasts for a predetermined time period.

5. The serial communications system according to claim 3, wherein the plurality of successively repeated data included in the preamble signal lasts for a predetermined number or more of pulses of the clock signal.

6. The serial communication system according to claim 4, wherein the plurality of successively repeated data are of logical high and the identification signal begins with data of logical low.

7. The serial communication system according to claim 6, wherein each one of the plurality of slave apparatuses is further configured to perform an authentication operation on the identification signal transmitted through a corresponding one of the plurality of slave circuits upon receiving the identification signal after the plurality of successively repeated data.

8. The serial communication system according to claim 7, wherein the designated slave apparatus matching with the identification signal recognizes the identification signal and transmits the second data including acknowledgement data to a corresponding slave circuit included in the plurality of slave circuits to cause the corresponding slave circuit to superimpose the acknowledgement data on the first serial data signal.

9. The serial communication system according to claim 7, comprising;
wherein the host apparatus recognizes that the corresponding slave apparatus specified by the identification data is not connected to the transmission path when the master circuit receives no serial data signal superimposed with acknowledge data and transmits another serial data signal superimposing another identification data for specifying another slave apparatus on the clock signal after transmitting a preamble signal including a plurality of successively repeated data again.

10. A method for performing serial communication using half-duplex channel communication, the method comprising steps of:
transmitting a preamble signal generated by superimposing successively repeated data on a clock signal to a transmission path;
transmitting a serial identification signal generated by superimposing on the clock signal identification data sent from a host apparatus, after transmitting the preamble signal;
extracting the identification data from the serial identification signal received through the transmission path;
outputting die extracted identification data to a slave apparatus;
generating a second serial data signal by superimposing second data, from a designated slave apparatus, on the serial identification signal during a low level of the clock signal;
transmitting through the transmission path the second serial data signal generated by superimposing on the serial identification signal said second data from said designated slave apparatus;
extracting the second data from the second serial data signal received through the transmission path; and
outputting the extracted second data to the host apparatus.

11. The method according to claim 10, comprising;
wherein the successively repeated data included in the preamble signal lasts for a predetermined time period.

12. The method according to claim 11, comprising;
wherein the successively repeated data included in the preamble signal lasts for a predetermined number or more of pulses of the clock signal.

13. The serial communications system according to claim 1, wherein the master circuit generates the first serial data signal by superimposing the first data on the clock signal during a high level of the clock signal.

14. The serial communications system according to claim 3, wherein the preamble signal comprises the plurality of successively repeated data superimposed on the clock signal.

15. The serial communications system according to claim 3, wherein the identification signal comprises identification data superimposed on the clock signal.

* * * * *